UNITED STATES PATENT OFFICE.

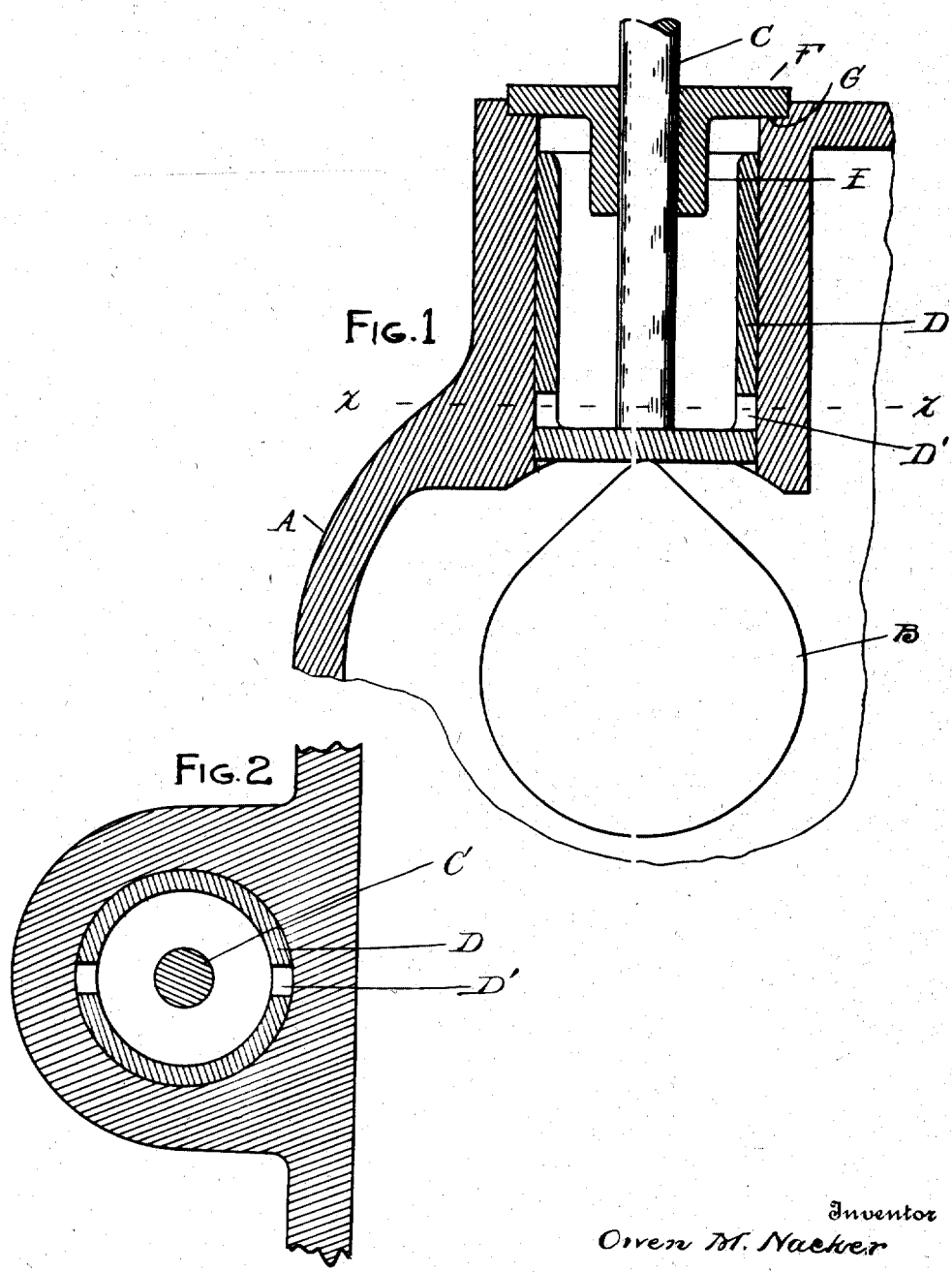

OWEN M. NACKER, OF DETROIT, MICHIGAN, ASSIGNOR OF ONE-HALF TO ALANSON P. BRUSH, OF DETROIT, MICHIGAN.

VALVE-ACTUATING MECHANISM.

1,222,194.     Specification of Letters Patent.     Patented Apr. 10, 1917.

Application filed June 19, 1916. Serial No. 104,533.

*To all whom it may concern:*

Be it known that I, OWEN M. NACKER, a citizen of the United States of America, residing at Detroit, in the county of Wayne and State of Michigan, have invented certain new and useful Improvements in Valve-Actuating Mechanism, of which the following is a specification, reference being had therein to the accompanying drawings.

The invention relates to valve-actuating mechanism for explosion engines and of that type in which the cam-shaft is arranged in the crank case of the engine and actuates valve rods extending outward from said case. With such constructions the diameter of the rod is less than is required for a proper bearing for the cam on the end thereof, and consequently it is usual to provide an enlarged head. This requires a provision in the crank case for the introduction of the head of the rod, as well as a bearing for the rod in which it is free to slide. There is also a tendency for the lubricant which is splashed by the cranks upon the cam and rod to creep upward between the rod and its bearing and thus to work out of the case. To obtain a simplified mechanism and to avoid the objection just described I have devised the following construction:

In the drawings:

Figure 1 is a vertical section through a portion of the crank case in the plane of the valve rod, and showing my improved construction; and Fig. 2 is a horizontal section on line *x—x* of Fig. 1.

A is the crank case, B is the cam and C is the valve-rod to be actuated thereby. The aperture in the crank-case through which the rod C passes, instead of being of corresponding diameter, is of an enlarged cylindrical bore, and in this bore is placed a cup-shaped member D slidably engaging the same. The lower end or bottom of this cup is of sufficient width to form a proper bearing for the cam, and just above the bottom one or more drain apertures D' are formed in the side wall of the cup, these apertures being exposed below the bore in the crank-case in the depressed position of the cup. The rod C is guided in a bearing E which is formed upon a cap member F seated in a counter-bore or concentric recess G in the crank-case, the bearing E extending downward within the cup.

With the construction as described the rotation of the cam will impart a reciprocatory movement to the cup member D, which in turn will actuate the valve rod C, resting on the bottom thereof. Any lubricant which may work up between the walls of the cup and the bore in the crank-case will be stopped from further movement by the cap G and will drain down into the cup, from which it is discharged through the apertures D' in the depressed position of the cup. The stem C is protected by the imperforate bottom of the cup from the direct splash of the lubricant, and will be supplied from the cup with sufficient amount for its own lubrication. The cover or cap F may be secured in position by any suitable means (not shown).

What I claim as my invention is:—

1. In an engine, the combination with a casing and a cam therein, of a valve rod actuated by said cam passing through an enlarged bore in said casing, a cup member slidably engaging said bore and having its bottom portion forming an enlarged bearing for the cam and a seat for said rod, and a detachable cap for the upper end of said bore constituting a bearing for said rod.

2. In an engine, the combination with a casing, of a cam therein, a valve rod actuated by said cam, extending through an enlarged bore in said casing, a cup member slidably engaging said bore and the bottom forming an enlarged bearing for the cam, said rod projecting downward within said cup and resting centrally upon said bottom, a detachable cap for closing the upper end of said bore, and a bearing for said rod integral with said cap and projecting downward within said cup.

3. In an engine, the combination with a casing, of a cam therein, a valve rod actuated by said cam passing through an enlarged cylindrical bore in said casing, a cup member having cylindrical walls slidably engaging said bore and the bottom forming an enlarged bearing for said cam, said cup being provided with a drain aperture exposed beneath said bore in the depressed position of the cup, and a cap for said bore having a depending portion within said cup forming a bearing for said rod.

4. In an engine, the combination with a casing and a cam-shaft therein, of a valve-actuating member in the form of a cup slidably engaging an aperture in said casing and operatively engaging said cam-shaft, said cup having a laterally-opening drain aperture, uncovered in its downward position of adjustment and sealed by said casing in its upward position of adjustment.

In testimony whereof I affix my signature.

OWEN M. NACKER.